US012172427B2

(12) United States Patent
Suzuki

(10) Patent No.: US 12,172,427 B2
(45) Date of Patent: Dec. 24, 2024

(54) PRINTING APPARATUS

(71) Applicant: BROTHER KOGYO KABUSHIKI KAISHA, Nagoya (JP)

(72) Inventor: Shuhei Suzuki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 125 days.

(21) Appl. No.: 17/937,884

(22) Filed: Oct. 4, 2022

(65) Prior Publication Data

US 2023/0108513 A1 Apr. 6, 2023

(30) Foreign Application Priority Data

Oct. 5, 2021 (JP) ................................ 2021-163883

(51) Int. Cl.

| | |
|---|---|
| ***B41J 11/00*** | (2006.01) |
| ***B41J 2/15*** | (2006.01) |
| ***B41J 2/21*** | (2006.01) |
| ***B41M 7/00*** | (2006.01) |

(52) U.S. Cl.

CPC ........... *B41J 11/00214* (2021.01); *B41J 2/15* (2013.01); *B41J 2/2107* (2013.01); *B41M 7/0081* (2013.01)

(58) Field of Classification Search

CPC ...... B41J 11/00214; B41J 2/15; B41J 2/2107; B41J 2/2114; B41J 2/2117; B41J 11/00212; B41M 7/0081

See application file for complete search history.

(56) References Cited

U.S. PATENT DOCUMENTS

| | | | |
|---|---|---|---|
| 2002/0054180 A1 | 5/2002 | Shibata et al. | |
| 2005/0285896 A1 | 12/2005 | Hori | |
| 2011/0134179 A1* | 6/2011 | Otsuka .............. | B41J 11/00212 347/102 |
| 2022/0016916 A1 | 1/2022 | Saito et al. | |

FOREIGN PATENT DOCUMENTS

| | | |
|---|---|---|
| JP | 2002067297 A | 3/2002 |
| JP | 2006044234 A | 2/2006 |
| JP | 2006346982 A | 12/2006 |
| JP | 2014124944 A | 7/2014 |

(Continued)

*Primary Examiner* — Lisa Solomon

(74) *Attorney, Agent, or Firm* — Scully, Scott, Murphy & Presser, PC

(57) ABSTRACT

A printing apparatus, including a discharging head for discharging ultraviolet-curable ink droplets, an energizer to supply energy to the ink droplets, a carriage with the discharging head and the energizer mounted thereon movable in a main scanning direction, and a controller, is provided. The controller forms a dots-linked portion having a plurality of the ink droplets landed on the printable medium being linked with one another and cured in a shape elongated in the main scanning direction. The controller forms both a dividing dot and a divided-dots linking portion or the divided-dots linking portion alone. The dividing dot is formed of a single one of the ink droplets cured independently at a position to one of adjoin and overlap the dots-linked portion in the main scanning direction. The divided-dots linking portion has a plurality of the ink droplets being linked and cured in a shape elongated in a sub-scanning direction.

19 Claims, 12 Drawing Sheets

(56) References Cited

FOREIGN PATENT DOCUMENTS

| | | | |
|---|---|---|---|
| JP | 2015035703 | A | 2/2015 |
| JP | 2018035233 | A | 3/2018 |
| JP | 2018122529 | A | 8/2018 |
| JP | 2020093532 | A | 6/2020 |
| WO | 2009148074 | A1 | 12/2009 |

* cited by examiner

PRINTING APPARATUS

REFERENCE TO RELATED APPLICATIONS

This application claims priority under 35 U.S.C. § 119 from Japanese Patent Application No. 2021-163883, filed on Oct. 5, 2021, the entire subject matter of which is incorporated herein by reference.

BACKGROUND ART

The present disclosure is related to a printing apparatus having a discharging head, which may discharge ink droplets at a printable medium, and an energizer, which may fix the ink droplets on the printable medium.

A printing apparatus capable of energizing ink to fix the ink on a printable medium is known. The printing apparatus may be equipped with an inkjet module having a discharging head, which may discharge droplets of ultraviolet (UV)-curable ink at a printable medium, and a lighting unit, which may emit UV rays to cure the ink on the printable medium. The lighting unit may irradiate the ink droplets landed on the printable medium with the UV rays so that the ink droplets may be cured and fixed on the printable medium.

The inkjet module may perform interlaced printing, in which, the printable medium stays in place without being conveyed between two consecutive ink-discharging passes. In interlaced printing, a method called as shingling printing may be used in order to eliminate streaks at joints between the passes. In shingling printing, the passes may be arranged such that an area in which an image is printed in a later pass overlaps an area in which an image is printed in an earlier pass, and an amount of the ink droplets to be discharged per pass may be reduced in the overlapping area. Thereby, occurrence of the streaks at the joints between the passes may be restrained or eliminated.

DESCRIPTION

In the inkjet printing apparatus that requires a process to fix the ink on the printable medium, in other words, in the printing apparatus that uses the UV-curable ink as mentioned above, the ink droplets may stay uncured in the form of liquid until the ink droplets are exposed to the UV rays. Therefore, if an uncured ink droplet touches another uncured ink droplet on the printable medium, the ink droplets may join together and grow. In particular, in shingling printing, the ink droplets may join each other more frequently in areas where a larger amount of ink droplets are discharged, while it may be less likely that the ink droplets join each other in areas where a smaller amount of ink droplets are discharged. As a result, streaks and uneven gloss may be created along a main scanning direction. This unevenness may be likely to occur when, in order to form a white layer to securely conceal a base color of the printable medium, a large amount of white ink droplets are discharged.

The present disclosure is advantageous in that a printing apparatus capable of improving image printing quality by restraining streaks and uneven gloss is provided.

In the following paragraphs, with reference to the accompanying drawings, an embodiment of the present disclosure will be described. It is noted that a printing apparatus described below is merely an embodiment of the present disclosure, and various connections may be set forth between elements in the following description. These connections in general and, unless specified otherwise, may be direct or indirect and that this specification is not intended to be limiting in this respect.

Figure 1:
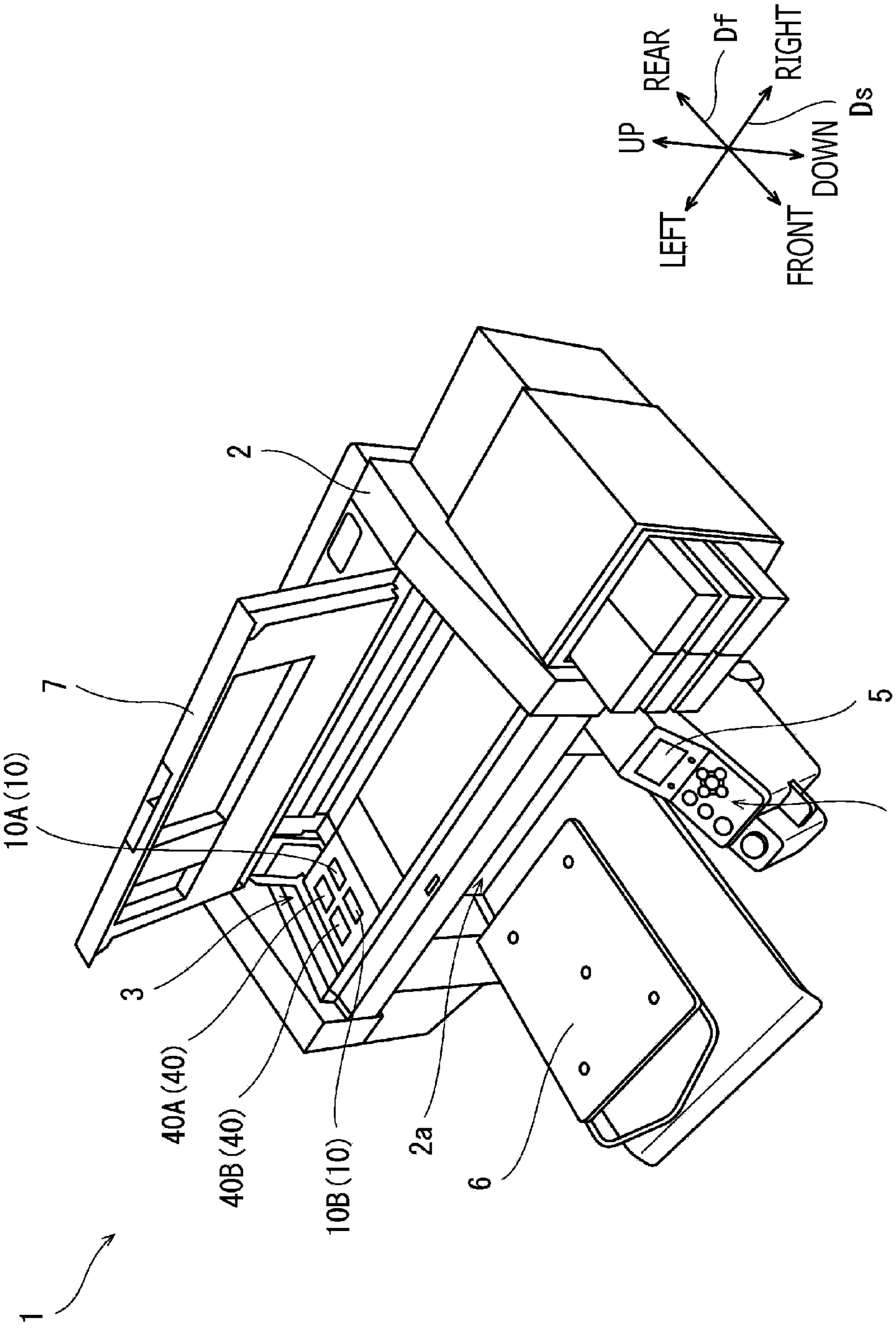
FIG. 1 is a perspective view of a printing apparatus.

FIG. 1 is a perspective view of a printing apparatus 1 according to the embodiment of the present disclosure. In the following description, directions in three (3) dimensions intersecting orthogonally to one another may be called as a vertical direction, a widthwise direction, and a front-rear direction, as indicated by bidirectionally pointing allows shown in FIG. 1. The widthwise direction may also be called as a main scanning direction Ds, and the front-rear direction may also be called as a sub-scanning direction Df. The printing apparatus 1 may print images not only on printable media W such as sheets but also on printable media W being goods, such as resin products.

As shown in FIG. 1, the printing apparatus 1 in the present embodiment has a housing 2, a carriage 3, operation keys 4, a display 5, a platen 6, and an upper cover 7. Moreover, the printing apparatus 1 has a controller unit 19 (see FIG. 3), which will be described further below. The platen 6 may convey the printable medium W, and the controller unit 19 may control operations in the printing apparatus 1.

The housing 2 may have a form of a box. The housing 2 has an opening 2*a* on a front side thereof and an opening, which is not shown, on a rear side thereof. At rightward-front positions of the housing 2, the operation keys 4 are arranged. At a rearward position with respect to the operation keys 4, the display 5 is arranged. The operation keys 4 may accept operations input by a user. The display 5 may include, for example, a touch panel and may display predetermined types of information. A part of the display 5 may work as an operation key at a predetermined timing. The controller unit 19 may, based on input through the operation keys 4 or external input through a communication interface, which is not shown, perform printing and control the display 5 to display the information.

Figure 2:
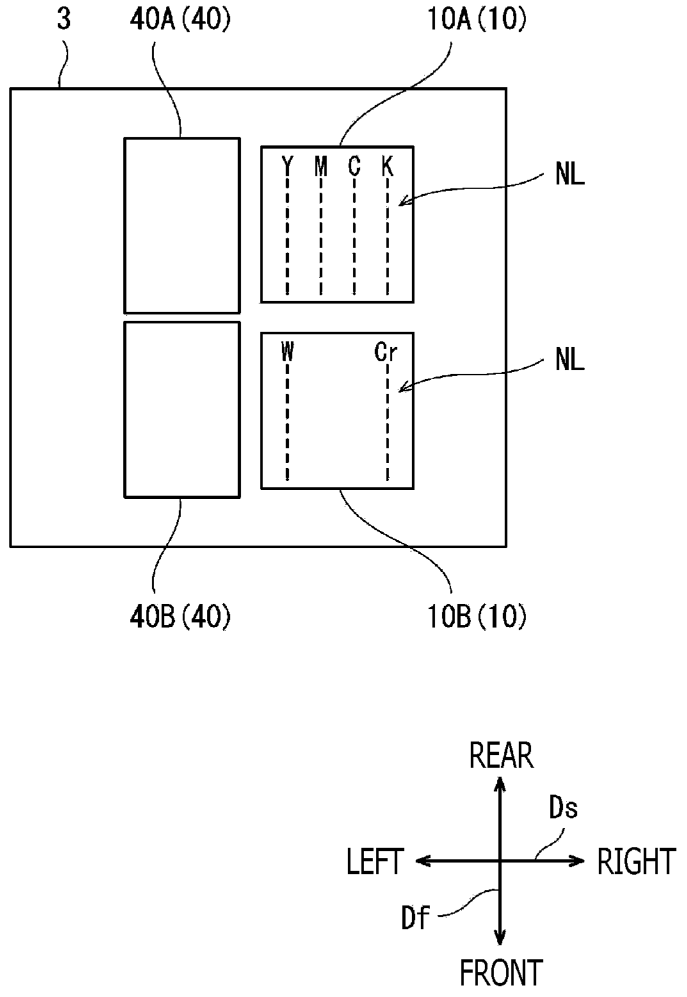
FIG. 2 illustrates arrangement of a discharging head and a lighting unit mounted on a carriage of the printing apparatus.

As shown in FIG. 2, on the carriage 3, the discharging head 10 and a lighting unit 40 are mounted. More specifically, the discharging head 10 including two (2) discharging heads 10A, 10B and the lighting unit 40 including two (2) lighting units 40A, 40B are mounted on the carriage 3. The carriage 3 may reciprocate along the main scanning direction Ds. In other words, the carriage 3 may move the discharging head 10 and the lighting unit 40 in the main scanning direction Ds.

Figure 6:
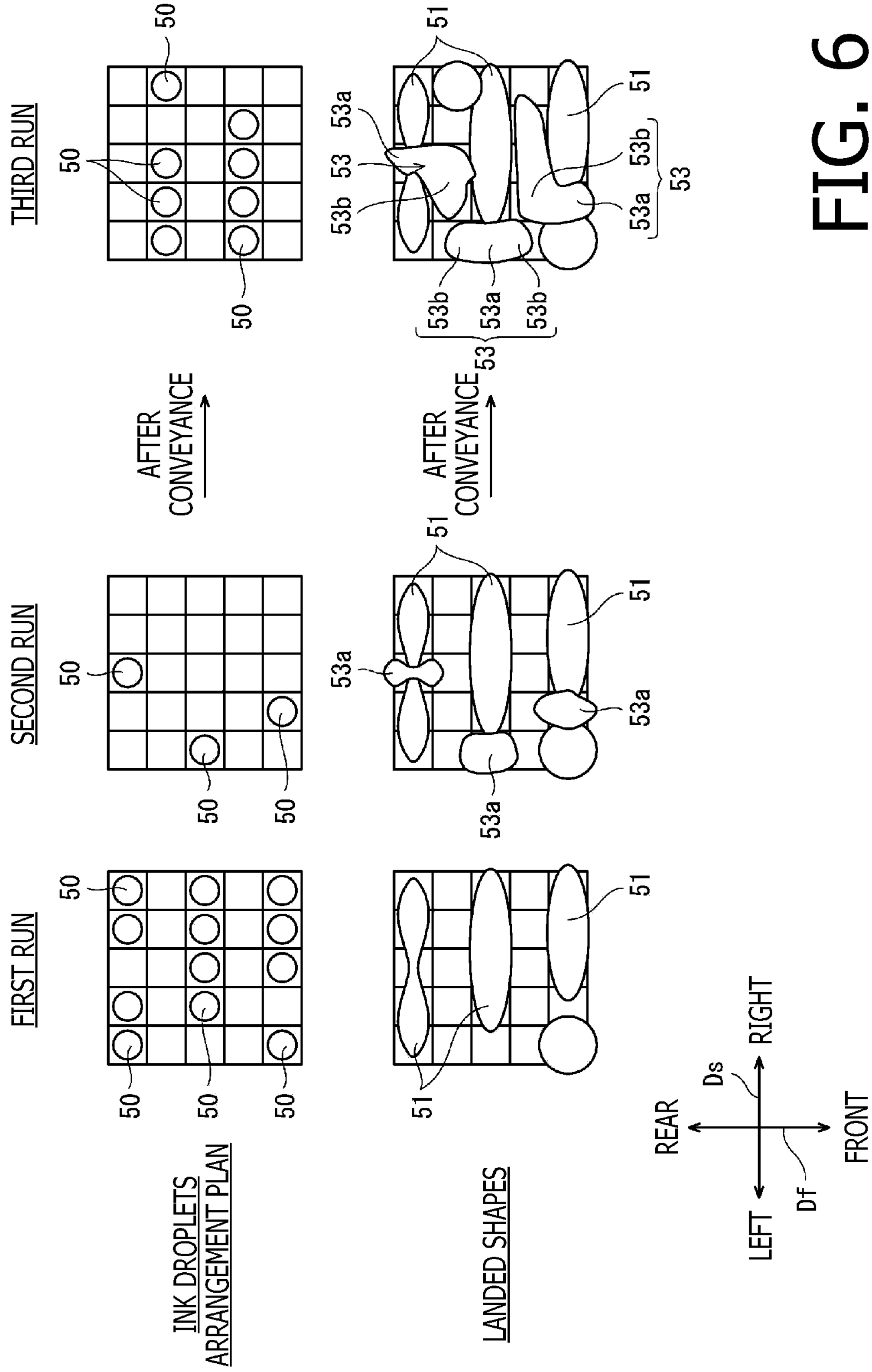
FIG. 6 illustrates ink droplets arrangement plans and shapes of the ink droplets after landing for first through third runs of the carriage in the printing apparatus.

The discharging heads 10A, 10B may be, for example, inkjet heads that may discharge UV-curable ink droplets 50 (see, for example, FIG. 6). Each of the lighting units 40A, 40B includes a plurality of LED chips DT (see FIG. 4), which may emit UV rays. The discharging head 10A and the discharging head 10B are arranged side by side along the sub-scanning direction Df The discharging head 10B may be located frontward with respect to the discharging head 10A. Meanwhile, the lighting unit 40A and the lighting unit 40B are arranged side by side along the sub-scanning direction Df The lighting unit 40B may be located frontward with respect to the lighting unit 40A. Furthermore, the discharging head 10A and the lighting unit 40A are arranged side by side along the main scanning direction Ds. The lighting unit 40A may be located leftward with respect to the discharging head 10A. The discharging head 10B and the lighting unit 40B are arranged side by side along the main scanning direction Ds. The lighting unit 40B may be located leftward with respect to the discharging head 10B. It may be noted, however, that the arrangement of the discharging heads 10A, 10B and the lighting units 40A, 40B is merely an example and may not necessarily be limited to the arrangement described above.

The LED chips DT in the lighting unit 40A are in an arrangement such that a UV ray-emitting range of the LED chips DT is greater than a dimension of nozzle lines NL (see FIG. 2) in the sub-scanning direction Df Therefore, the UV rays may substantially reach to irradiate the ink droplets, including ink droplets 50 discharged from one end, e.g., a frontward end, and the other end, e.g., a rearward end, of the nozzle lines NL in the sub-scanning direction Df In a first run in a printing process, the carriage 3 may move rightward in the main scanning direction Ds. Thereby, the discharging head 10 and the lighting unit 40 may move rightward in the printing process. Meanwhile, the discharging head 10 moving rightward in the main scanning direction Ds may discharge the ink droplets 50 at the printable medium W, and the lighting unit 40 moving rightward in the main scanning direction Ds may irradiate the ink droplets 50 landed on the printable medium W with the UV rays. Thus, with the lighting unit 40 located rearward with respect to the discharging head 10 in a moving direction of the carriage 3 moving in the printing process, the ink droplets 50 on the printable medium W may be irradiated with the UV rays immediately after landing. The actions of the discharging head 10 will be described further below.

In the present embodiment, the discharging head 10A may discharge ink droplets 50 in colors of yellow (Y), magenta (M), cyan (C), and black (K), which may be generally called as color inks. FIG. 2 illustrates the discharging head 10A, representing the discharging head 10, for discharging the ink droplets 50 of color inks in the present embodiment. In the discharging head 10A, a plurality of nozzle lines NL are arranged side by side spaced from one another at equal intervals along the main scanning direction Ds. Each of the nozzle lines NL may discharge one of the four colored inks and longitudinally extends in the sub-scanning direction Df The nozzle lines NL in the discharging head 10A may be, but not necessarily, arranged in an order from left to right: a nozzle line NL for discharging the ink droplets 50 in yellow, a nozzle line NL for discharging the ink droplets 50 in magenta, a nozzle line NL for discharging the ink droplets 50 in cyan, and a nozzle line NL for discharging the ink droplets 50 in black.

Meanwhile, the discharging head 10B may discharge droplets 50 of white (W) ink and droplets 50 of clear (Cr) ink. In the discharging head 10B, a plurality of nozzle lines NL are arranged side by side spaced from each other along the main scanning direction Ds. Each of the nozzle lines NL may discharge the ink droplets 50 in one of the white and clear inks and longitudinally extends in the sub-scanning direction Df The interval between the nozzle lines NL may or may not be equal to the interval between the nozzle lines NL in the discharging head 10A. The nozzle lines NL in the discharging head 10B may be, but not necessarily, arranged in an order from left to right: a nozzle line NL for discharging the white ink droplets 50 and a nozzle line NL for discharging the clear ink droplets 50.

Thus, a multicolored image may be printed on the printable medium W by discharging the ink droplets 50 in the six colors at the printable medium W. When, for example, a multicolored image is printed on a piece of fabric being the printable medium W, in order to reduce influence of a base color of the fabric on the image and influence by the color inks to the material of the fabric, the ink droplets 50 in white may be discharged to form a base layer in advance, and the droplets 50 of the color inks may be discharged later on the ink droplets 50 in white landed on the printable medium W. The droplets 50 of the clear ink may be discharged to apply glossy coating over the printed image or to protect the printed image.

The platen 6 is configured to place the printable medium W thereon. The platen 6 has a predetermined thickness and includes a rectangular plate elongated in, for example, the sub-scanning direction Df The platen 6 is supported removably by a platen-supporting stand, which is not shown. The platen-supporting stand is movable between a printing position, at which an image may be printed on the printable medium W, and a removable position, at which the printable medium W may be removed from the platen 6. The printable position is a position, at which the platen 6 faces the discharging head 10, and the removable position is a position, at which the platen-supporting stand is located outside the housing 2 and at which the printable medium W may be set on the platen 6. While printing an image, the platen 6 moves in the sub-scanning direction Df therefore, the printable medium W placed on the platen 6 may be conveyed in the sub-scanning direction Df.

The upper cover 7 is pivotable upward by being lifted at a frontward part thereof. By pivoting the upper cover 7 upward, a cavity inside the housing 2 may be exposed.

Figure 3:
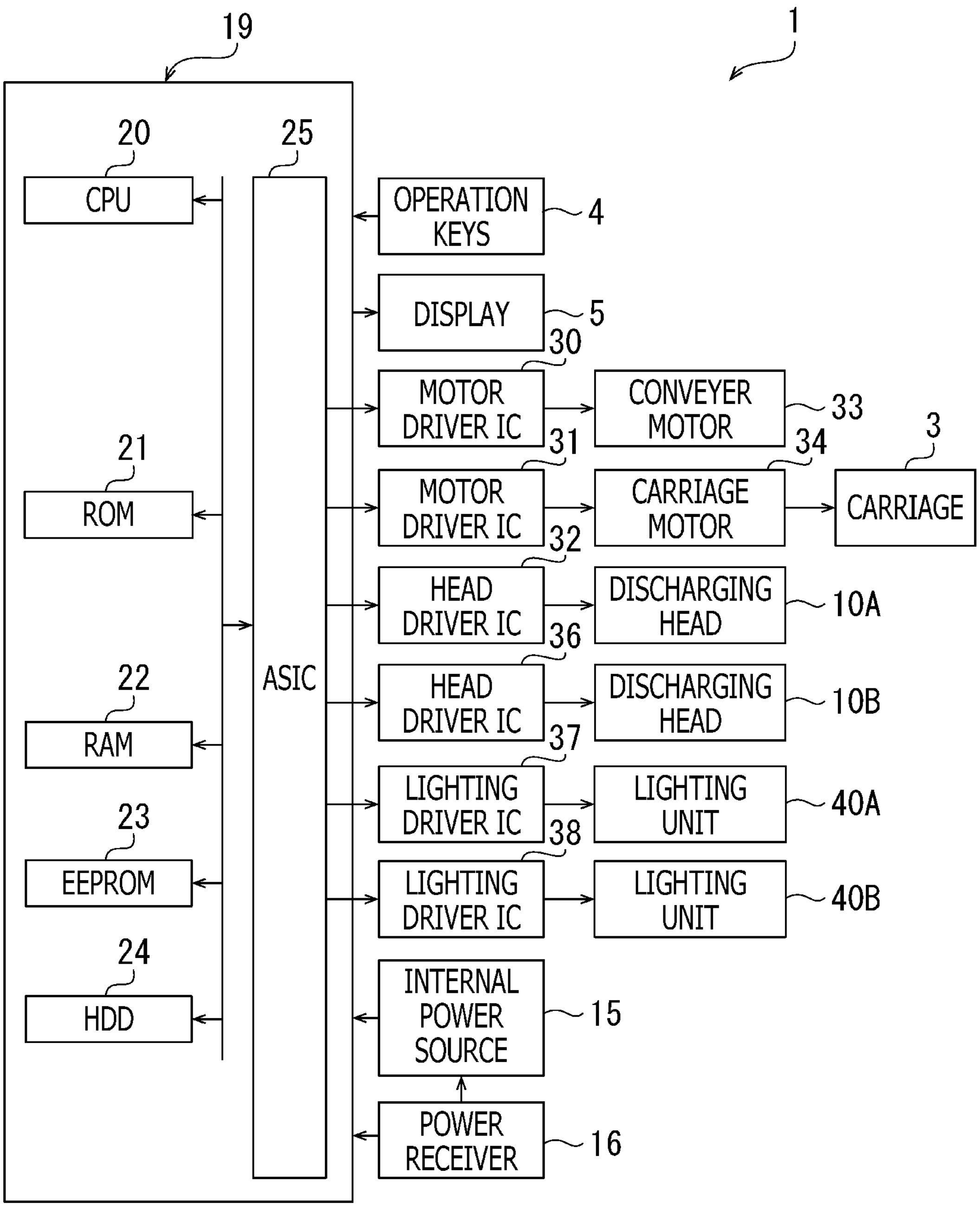
FIG. 3 is a block diagram to illustrate a configuration of the printing apparatus.

Next, functions of the components in the printing apparatus 1 will be described with reference to FIG. 3. Further to the components described above, as shown in FIG. 3, the printing apparatus 1 of the present embodiment includes motor driver ICs 30, 31, head driver ICs 32, 36, a conveyer motor 33, a carriage motor 34, lighting driver ICs 37, 38, an internal power source 15, and a power receiver 16.

The controller unit 19 has a CPU 20, storages including a ROM 21, a RAM 22, an EEPROM 23, and an HDD 24, and an ASIC 25. The CPU 20 is a controlling device in the printing apparatus 1 and is connected with the storages. The CPU 20 may control the driver ICs 30-32, 36-38, and the display 5.

The CPU 20 may execute predetermined programs stored in the ROM 21 to implement various functions. The CPU 20 may be mounted in the controller unit 19 as a single processer or may include a plurality of processors that may cooperate with one another.

The ROM 21 may store a print-controlling program that may cause the CPU 20 to execute a printing process. The RAM 22 may store results of computation by the CPU 20. The EEPROM 23 may store information concerning initial settings input by a user. The HDD 24 may store specific information. The specific information may be confidential information that may not be leaked outside and may include, for example, information concerning users, job data including user IDs, which may be transmitted to the printing apparatus 1 from outside and may identify senders of the jobs, user use-history information including the user IDs contained in the job data, secure job data including data concerning passwords and secure jobs, print history, and cloud setting data. The information concerning users may include, for example, information concerning address book, information concerning email addresses, information concerning an administrator (security manager) of the printing apparatus 1, and information concerning network settings. The CPU 20 may, when the printing apparatus 1 receives the job data, store the user use-history information including the user ID contained in the job data in the HDD 24.

To the ASIC 25, the motor driver ICs 30, 31, the head driver ICs 32, 36, the lighting driver ICs 37, 38 are connected. The CPU 20 may receive a print job from the user and output a printing command to the ASIC 25 according to the print-controlling program. The ASIC 25 may activate the drivers ICs 30-32, 36-38 according to the printing command. The CPU 20 may drive the conveyer motor 33 through the motor driver IC 30 to move the platen 6 in the sub-scanning direction Df, and thereby, the printable medium W may be conveyed in the sub-scanning direction Df The CPU 20 may drive the carriage motor 34 through the motor driver IC 31 to move the carriage 3 in the main scanning direction Ds. The CPU 20 may control the head driver ICs 32, 36 to discharge the ink droplets 50 through the discharging heads 10A, 10B mounted on the carriage 3 to print an image of image data on the printable medium W being conveyed. The CPU 20 may activate the lighting driver ICs 37, 38 to control the lighting units 40A, 40B to emit the UV rays that may cure the ink droplets 50 landed on the printable medium W.

The internal power source 15 is located at a predetermined position in the housing 2. The internal power source 15 enables the controller unit 19 to operate when a main power system of the printing apparatus 1 is off. The internal power source 15 may be, for example, a secondary battery. The power receiver 16 is arranged to be exposed outside the housing 2 to receive power from an external power source. When the main power system of the printing apparatus 1 is on, the power from the external power source may be supplied to the components in the printing apparatus 1 through the power receiver 16. Meanwhile, the power from the external power source may be supplied to the internal power source 15 through the power receiver 16 regardless of the on/off condition of the main power system, and the internal power source 15 may be charged with the power from the external power source.

Figure 4:
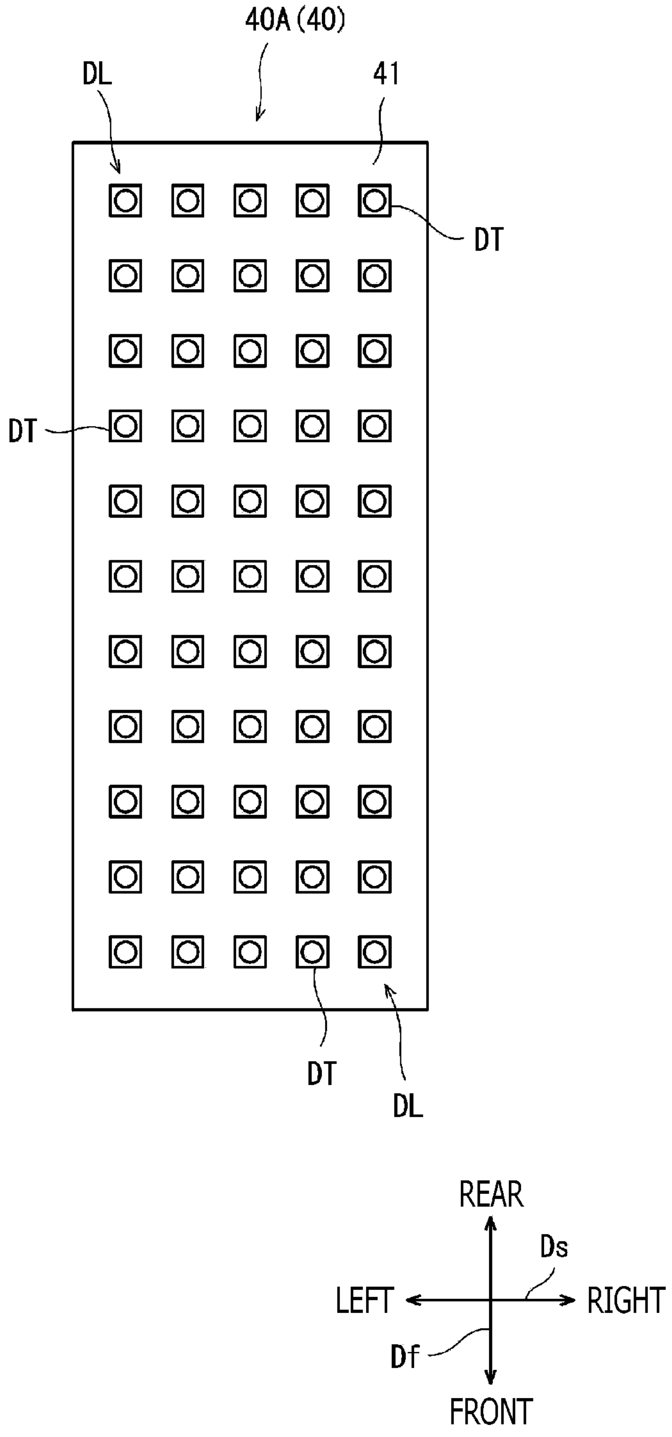
FIG. 4 illustrates arrangement of light-emitting diode (LED) chips of the lighting unit in the printing apparatus.

Each of the LED chips DT in the lighting unit 40 is a semiconductor device that may generate a UV ray. As shown in FIG. 4, the lighting unit 40A has a supporting board 41, which may be a rectangular board in a plan view. The supporting board 41 may be, for example, an aluminum board. The LED chips DT are arranged in matrix on the supporting board 41. The LED chips DT may emit the UV rays to irradiate the ink droplets 50 landed on the printable medium W to fix the ink droplets 50 on the printable medium W. In the following paragraphs, the ink droplet 50 landed on the printable medium W and cured by the UV ray may be called as a dot. The lighting unit 40B is in the substantially same configuration as the lighting unit 40B.

Next, scanning actions of the discharging head 10 according to the present embodiment will be described. Meanwhile, scanning actions of the discharging head 10B is substantially similar to that of the discharging head 10A; therefore, the actions of the discharging head 10A and actions of the lighting unit 40A will be representatively described.

Figure 5:
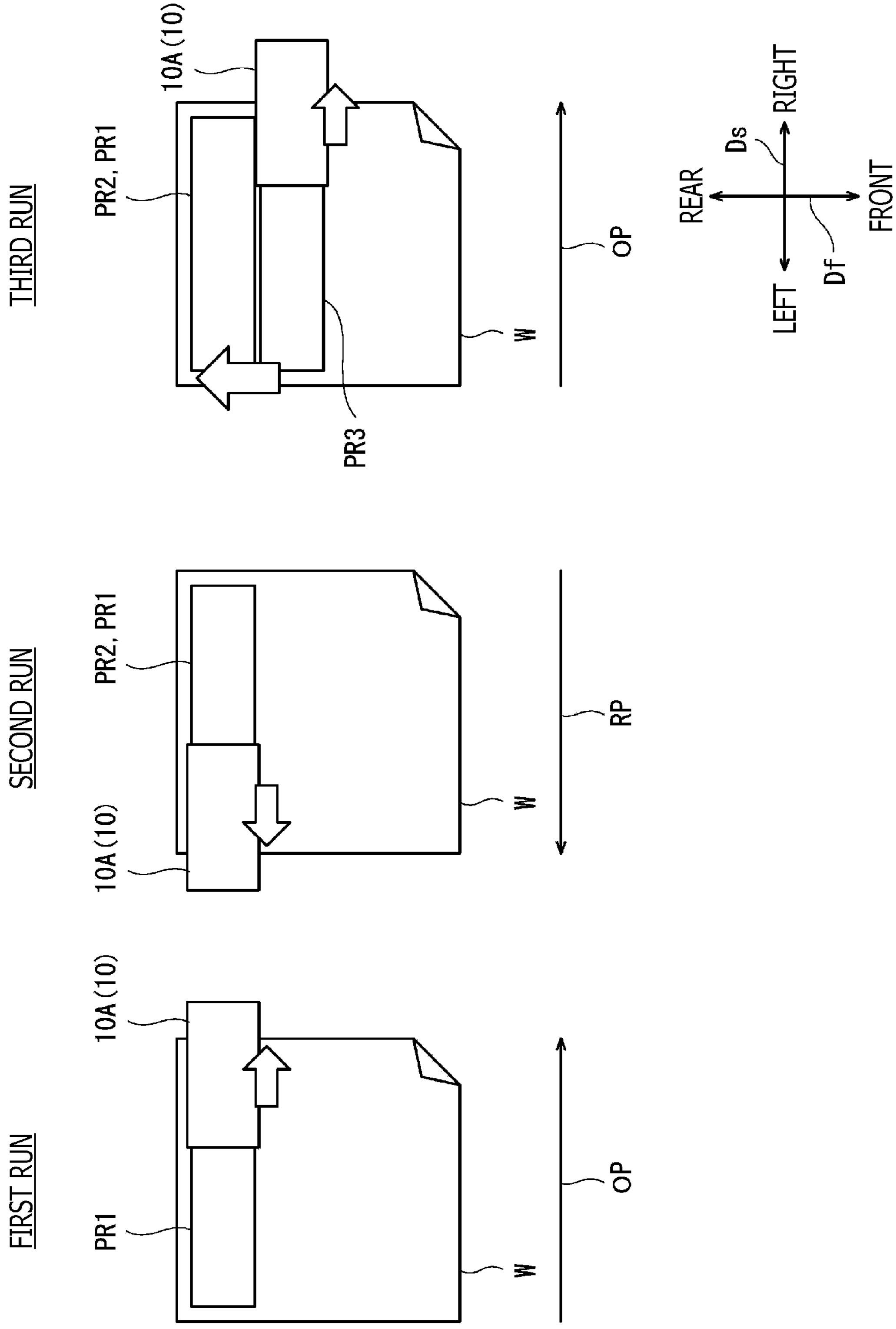
FIG. 5 illustrates bidirectional printing with the discharging head in the printing apparatus.

The discharging head 10A in the present embodiment may perform bidirectional printing. In particular, the CPU 20 in the controller unit 19 may control the carriage 3 to run back and forth, i.e., in one way OP and the other way RP along the main scanning direction Ds and control the discharging head 10A to discharge ink droplets 50 simultaneously. As shown in FIG. 5, the CPU 20 in the controller unit 19 may control the carriage 3 to perform a first run to move in one way OP, e.g., rightward, along the main scanning direction Ds and control the discharging head 10A to discharge the ink droplets 50. Simultaneously, the CPU 20 in the controller unit 19 may control the lighting unit 40A to emit the UV rays at the ink droplets 50 landed on the printable medium W to cure the ink droplets 50. Thereby, a printed part PR1 is formed.

Next, the CPU 20 in the controller unit 19 may, without conveying the printable medium W in the sub-scanning direction Df, control the carriage 3 to perform a second run to move in the other way RP, e.g., leftward, along the main scanning direction Ds and control the discharging head 10A to discharge the ink droplets 50. Thereby, a printed part PR2 that overlaps the printed part PR1 is formed. Thus, interlaced printing, in which the printed part PR1 formed in the first run and the printed part PR2 formed in the second run overlap, is performed. It may be noted, in the second run, the CPU 20 in the controller unit 19 controls the lighting unit 40A not to emit the UV rays. Therefore, the ink droplets 50 discharged and landed on the printable medium W in the second run may stay uncured.

Thereafter, the CPU 20 in the controller unit 19 controls the platen 6 to convey the printable medium W in the sub-scanning direction Df by a predetermined amount. Further, the CPU 20 in the controller unit 19 controls the carriage 3 to perform a third run to move in the one way OP, e.g., rightward, along the main scanning direction Ds and controls the discharging head 10A to discharge the ink droplets 50. Simultaneously, the CPU 20 in the controller unit 19 controls the lighting unit 40A to emit the UV rays at the ink droplets 50 landed on the printable medium W to cure the ink droplets. Thereby, a printed part PR3 is formed. Optionally, shingling printing, in which the printed part PR3 is formed at a position to partly overlap a part of the printed part PR2 in the sub-scanning direction Df, may be performed.

Meanwhile, some image quality defects such as streaks and uneven gloss in the printed image may be restrained or prevented by controlling the discharging head 10A to discharge the ink droplets 50 to form dots on the printable medium W in the following manner. FIG. 6 illustrates arrangement plans of the ink droplets 50 and landed shapes of the ink droplets 50 discharged in first through third runs of the carriage 3 in the printing apparatus 1. The ink droplets arrangement plans shown in FIGS. 6, 8, and 10-12 equate to two-dimensional illustration of dot data (discharge data) and illustrates arrangement of the ink droplets 50 discharged on the printable medium W. With reference to FIGS. 6, 8-12, examples of the ink droplet arrangement in 25 (5×5) pixels will be described, and a position of each ink droplet 50 will be specified by a row and a column.

FIG. 6 shows exemplary ink droplets arrangement plans for first through third runs of the carriage 3 and shapes of the ink droplets after landing on the printable medium W. In the first run, the ink droplets 50 may be arranged either consecutively along the main scanning direction Ds or independently from each other. For example, in FIG. 6, a group of ink droplets 50 aligning consecutively in the main scanning direction Ds is arranged in each of first, third, and fifth rows. Meanwhile, ink droplets 50 arranged along the sub-scanning direction Df are separated from one another by a distance of at least one pixel. In order to realize such arrangement of the ink droplets 50, the CPU 20 in the controller unit 19 may control the carriage 3 to move rightward along the main scanning direction Ds for the first run, control the discharging head 10A to discharge the ink droplets 50 at the printable medium W, and control the lighting unit 40A to irradiate the ink droplets 50 landed on the printable medium W with the UV rays. Thereby, some of the ink droplets 50 placed on the printable medium W may join each other and form dots-linked portions 51, which are cured in elongated shapes extending in the main scanning direction Ds, on the printable medium W.

Next, the ink droplets 50 discharged in the second run of the carriage 3 may be in an arrangement such that the ink droplets 50 are arranged separately from each other. In particular, the ink droplets 50 in the second run are located at positions where each ink droplet 50 discharged in the second run adjoins one or two of the ink droplets 50 having been discharged in the first run in the main scanning direction Ds. In other words, the ink droplet 50 is arranged in each of the first, third, and the fifth rows, similarly to the group of ink droplets 50 discharged in the first run. The ink droplets 50 discharged in the second run are separated from each other by a distance of at least one pixel in the main scanning direction Ds and in the sub-scanning direction Df In order to realize such arrangement of the ink droplets 50, the CPU 20 in the controller unit 19 may control the carriage 3 to move leftward along the main scanning direction Ds for the second run and control the discharging head 10A to discharge the ink droplets 50 at the printable medium W, without operating the lighting unit 40A for irradiating the ink droplets 50 landed on the printable medium W with the UV rays. Thereby, the ink droplets 50 discharged in the second run may stay uncured, and the uncured ink droplets 50, each of which will form a part 53*a* of a divided-dots linking portion 53, are placed on the printable medium W. The divided-dots linking portion 53 will be formed of the ink droplet 50 forming the part 53*a* and ink droplets 50 forming remainder parts 53*b*, which are formed in a next run of the carriage 3, being linked and cured. The divided-dots linking portion 53 will be described further below.

Next, the ink droplets 50 discharged in the third run of the carriage 3 are in arrangement such that the ink droplets 50 are arranged either consecutively in the main scanning direction D1 or separately from one another. In particular, a group of ink droplets aligning consecutively in the main scanning direction Ds is arranged in each of the second row and the fourth row. In other words, the ink droplets 50 discharged in the third run are provided to pixels in the rows left blank in the first run. Moreover, some of the ink droplets 50 discharged in the third run are located at positions to adjoin the ink droplets 50 discharged in the second run in the sub-scanning direction Df. In order to realize such arrangement of the ink droplets 50, the CPU 20 in the controller unit 19 may control the platen 6 to move the printable medium W in the sub-scanning direction Df by a predetermined amount, thereafter, control the carriage 3 to move rightward along the main scanning direction Ds, control the discharging head 10A to discharge the ink droplets 50 at the printable medium W, and control the lighting unit 40A to irradiate the ink droplets 50 landed on the printable medium W with the UV rays. Thereby, the ink droplets 50 to form the remainder parts 53*b* of the divided-dots linking portion 53 are placed, and the ink droplets 50 forming the parts 53*a* and the remainder parts 53*b* are linked and cured to together form the divided-dots linking portions 53.

In this manner, the divided-dots linking portions 53 are formed to adjoin or overlap the dots-linked portions 51 in elongated shapes extending in the sub-scanning direction Df The part 53*a* and the remainder part 53*b* of the divided-dots linking portion 53 adjoin each other in the sub-scanning direction Df Meanwhile, the divided-dots linking portions 53 may be, as shown in FIG. 6, displaced from one another in the main scanning direction Ds.

As described above, the ink droplets 50 discharged in the second run adjoin the ink droplets 50 discharged in the third run in the sub-scanning direction Df Therefore, as shown in FIG. 6, the parts 53*a* of the divided-dots linking portions 53 discharged in the second run adjoin the remainder parts 53*b* of the divided-dots linking portions 53 landed on the printable medium W in the sub-scanning direction Df When the ink droplets 50 discharged later, i.e., in the third run, land on the printable medium W at the positions to adjoin the uncured ink droplets 50 having been discharged earlier, i.e., in the second run, the ink droplets 50 landed later tend to be drawn to join the ink droplets 50 landed earlier. This behavior of the ink droplets 50 will be described further in the following paragraphs.

Figure 7:
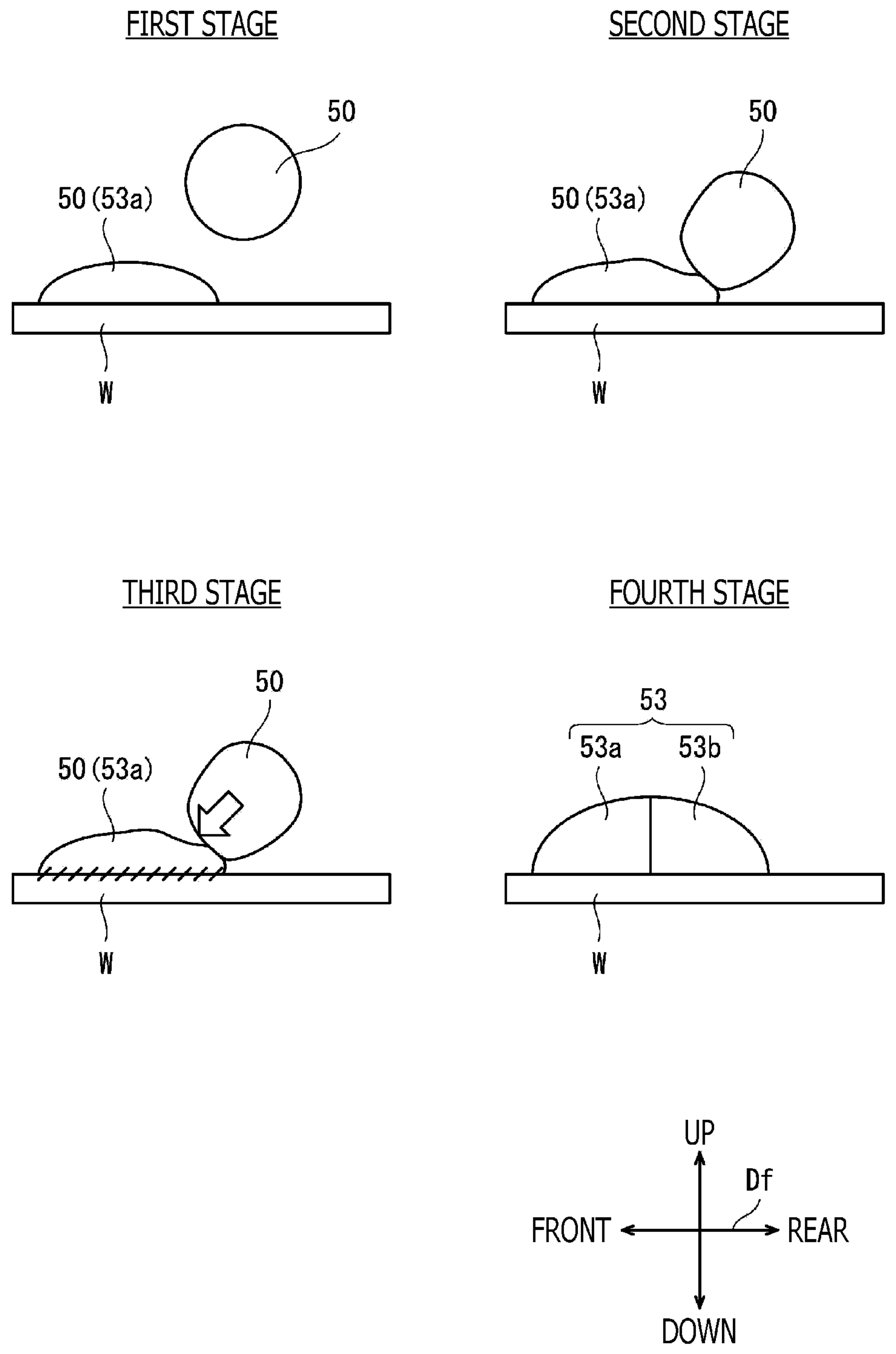
FIG. 7 illustrates a joining behavior of an ink droplet that landed earlier and an ink droplet landed later on the printable medium.

As shown in FIG. 7, in a first stage, a preceding ink droplet 50 to form a part 53*a* of a divided-dots linking portion 53 is placed on the printable medium W, and thereafter, a succeeding ink droplet 50 is discharged at a position to adjoin the part 53*a* in the sub-scanning direction Df Meanwhile, the UV rays are not emitted at the part 53*a* of the divided-dots linking portion 53. Therefore, the uncured part 53*a* may spread on the printable medium W. While the part 53*a* stays uncured and spreads on the printable medium W, in a second stage, the succeeding ink droplet 50 may contact the ink droplet 50 that forms the uncured part 53*a* of the divided-dots linking portion 53 before landing on the printable medium W. In this instant, the ink droplet 50 to form the part 53*a* of the divided-dots linking portion 53 and the succeeding ink droplet 50 tend to join each other due to the effect of surface tension.

In a third stage, while the ink droplet 50 to form the part 53*a* of the divided-dots linking portion 53 is touching on the printable medium W, the succeeding ink droplet 50, which is more mobile in the air, may easily be attracted to the ink droplet 50 to form the part 53*a*. In a fourth stage, the succeeding ink droplet 50 to form the remainder part 53*b* and the preceding ink droplet 50 to form the part 53*a* are linked and cured to together form the divided-dots linking portion 53 on the printable medium W.

Thus, the ink droplet 50 discharged in the second run and the ink droplet 50 discharged in the third run may be linked with each other in the sub-scanning direction Df easily, and the divided-dots linking portion 53 extending in the sub-scanning direction Df may be formed on the printable medium W.

More specifically, as shown in FIG. 6, by forming the part 53*a* of the divided-dots linking portion 53 with the ink droplet 50 discharged at the position of the third row in the first column in the second run earlier, the remainder part 53*b* of the divided-dots linking portion 53 formed with the ink droplet 50 discharged later at the position of the second row in the first column in the third run may be drawn in the sub-scanning direction Df to the ink droplet 50 forming the part 53*a*. In this regard, the ink droplet 50 discharged later at the position of the second row in the first column may be drawn to the ink droplet 50 forming the part 53*a* at the position of the third row in the first column before the ink droplet 50 discharged at the position of the second row in the second column lands on the printable medium W. Therefore, the ink droplet 50 discharged in the third run at the position of the second row in the first column may be prevented from being linked with the neighboring ink droplet located at the position of the second row and the second column. Moreover, with the part 53*a* of the divided-dots linking portion 53 provided earlier, the remainder part 53*b* of the divided-dots linking portion 53 formed with the ink droplet 50 discharged in the third run at the position of the fourth row in the first column may be drawn in the sub-scanning direction Df to the ink droplet 50 forming the part 53*a*. Accordingly, the ink droplet 50 discharged in the third run at the position of the fourth row in the first column may be prevented from being linked with the neighboring ink droplet 50 located at the position of the fourth row in the second column. Thus, some of the ink droplets 50 discharged in the third run may be prevented from being linked in the main scanning direction Ds with the other ink droplets 50 discharged in the third run.

Figure 8:
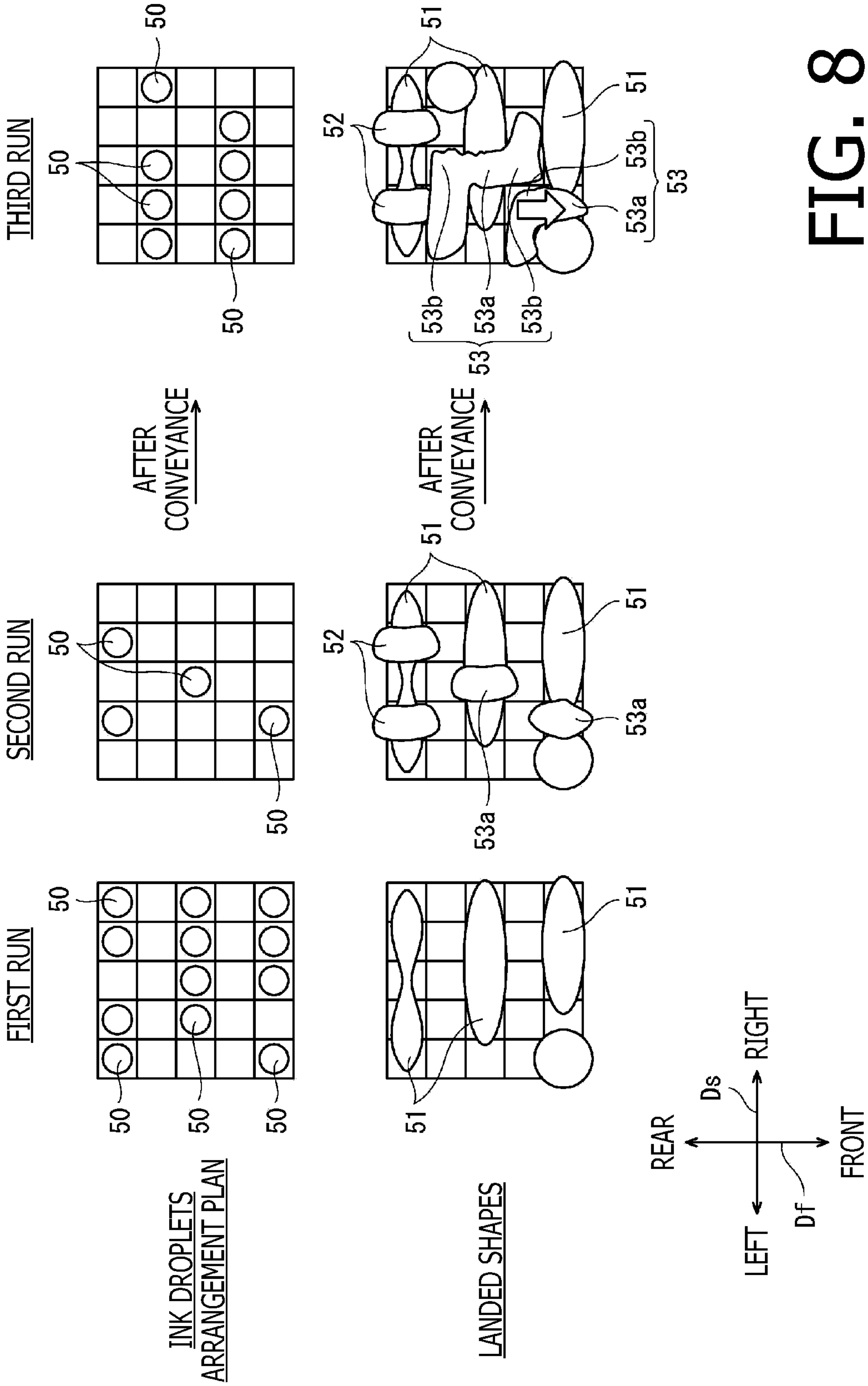
FIG. 8 illustrates another ink droplets arrangement plans and shapes of the ink droplets after landing for first through third runs of the carriage in the printing apparatus.

For another example, the ink droplets 50 may be planned in an arrangement as shown in FIG. 8. FIG. 8 shows exemplary ink droplets arrangement plans for the first through third runs of the carriage 3 and shapes of the ink droplets 50 landed on the printable medium W.

As shown in FIG. 8, the ink droplets arrangement plan for the first run of the carriage 3 is the same as the ink droplets arrangement plan for the first run in FIG. 6. As shown in FIG. 8, the dots-linked portions 51 are formed in the same arrangement as the dots-linked portions 51 in FIG. 6.

An example of the ink droplets arrangement plan for the second run of the carriage 3 will be described. Some of the ink droplets 50 to be discharged in the second run may be located at positions different from those in FIG. 6, but the ink droplets 50 may be arranged in the substantially similar manner to the ink droplets 50 in the example of FIG. 6. In particular, as shown in FIG. 8, the ink droplet 50 at the position of the first row in the fourth column and the ink droplet 50 at the position of the third row in the third column are located at positions to overlap the ink droplets 50 discharged in the first run. Moreover, in FIG. 8, the ink droplets 50 discharged in the second run will, when they cure on the printable medium W, form dividing dots 52 at positions displaced in the main scanning direction Ds from one another. In order to realize such arrangement of the ink droplets 50, the CPU 20 in the controller unit 19 may control the carriage 3 to move leftward along the main scanning direction Ds for the second run and control the discharging head 10A to discharge the ink droplets 50 at the printable medium W, without operating the lighting unit 40A for irradiating the ink droplets 50 landed on the printable medium W with the UV rays. Thereby, the ink droplets 50 discharged in the second run may stay uncured, and the uncured ink droplets 50 to form the dividing dots 52 and uncured ink droplets 50 to form the parts 53*a* of the divided-dots linking portions 53 are placed on the printable medium W.

The ink droplets arrangement plan for the third run of the carriage 3 is the same as the ink droplets arrangement plan for the third run in the example of FIG. 6. In FIG. 8, some of the ink droplets 50 to be discharged in the third run are located at positions to adjoin the ink droplets 50 discharged in the second run in the sub-scanning direction Df Meanwhile, none of the ink droplets 50 discharged in the third run is located at a position to adjoin the ink droplet 50 at the position of the first row in the fourth column discharged in the second run in the sub-scanning direction Df This is because, unlike the intention of the ink droplets arrangement plans in the example of FIG. 6 that the succeeding ink droplet 50 should be drawn to the preceding ink droplet 50 in the sub-scanning direction Df, the ink droplet 50 at the position of the first row in the fourth column in the second run in the example of FIG. 8 is intended to divide the dots-linked portion 51 formed in the first run in the main scanning direction Ds.

In order to realize such arrangement of the ink droplets 50 for the third run, the CPU 20 in the controller unit 19 may control the platen 6 to move the printable medium W in the sub-scanning direction Df by a predetermined amount, thereafter, control the carriage 3 to move rightward along the main scanning direction Ds, control the discharging head 10A to discharge the ink droplets 50 at the printable medium W, and control the lighting unit 40A to irradiate the ink droplets 50 landed on the printable medium W with the UV rays. Thereby, the ink droplets 50 to form the remainder parts 53*b* of the divided-dots linking portion 53 are placed, and the ink droplets 50 forming the parts 53*a* and the ink droplets 50 forming the remainder parts 53*b* are linked and cured to form the divided-dots linking portions 53. Moreover, according to the example shown in FIG. 8, the dividing dots 52 divide the dots-linked portion 51 in the main scanning direction Ds. Therefore, the dividing dots 52 may break continuity of the dots-linked portion 51.

This paragraph summarizes the rules for the ink droplets arrangement plans for the second run and the third run. First, in order to prevent the ink droplets 50 from joining in the second run, the ink droplets 50 discharged in the second run are located apart from one another by a distance of at least one pixel (Rule 1). Second, in order to encourage groups of the ink droplets 50 that tend to be linked with each other in the main scanning direction Ds to be linked with each other easily, the ink droplets 50 in the second run are located at positions, at which a number of adjoining ink droplets to be discharged in the third run is large (Rule 2). The number of adjoining ink droplets 50 is a total number of the ink droplets 50 that will be discharged in the third run and will adjoin an ink droplet 50 discharged in the second run in widthwise, front-rear, and diagonal directions without being spaced apart by a blank pixel. The following paragraphs will explain details of the number of adjoining ink droplets.

Figure 9:
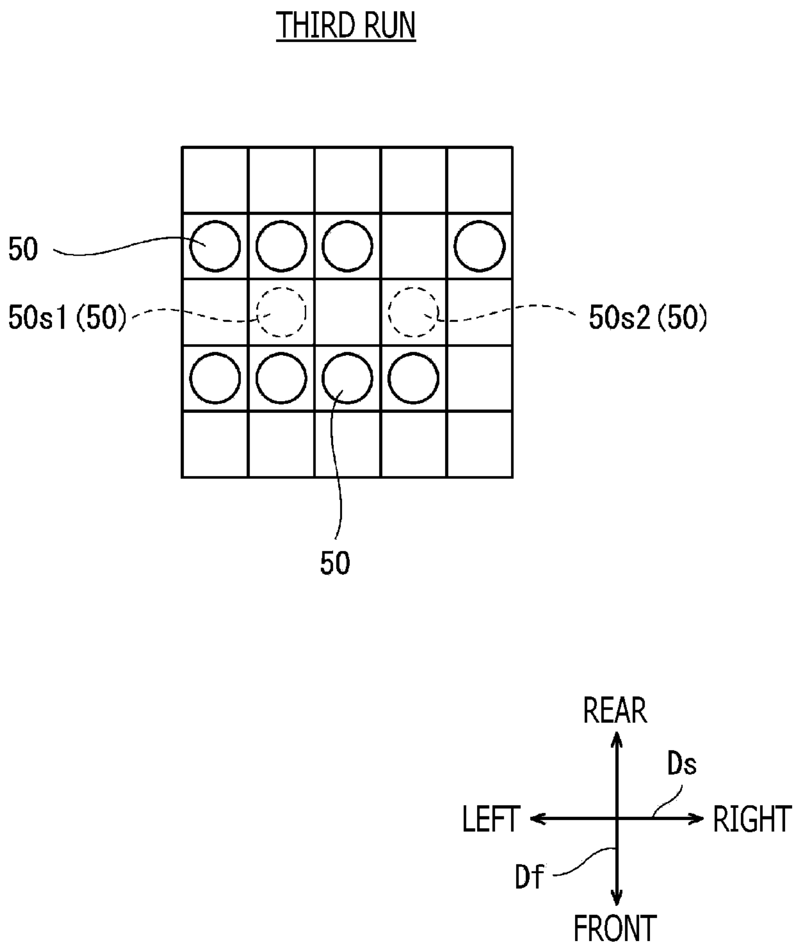
FIG. 9 illustrates positional relation between ink droplets discharged in the second run and the third run of the carriage in the printing apparatus.

In FIG. 9, the ink droplets 50 (50*s*1, 50*s*2) to be discharged in the second run are shown in broken lines, and the ink droplets 50 to be discharged in the third run are shown in solid lines. According to the definition of the number of adjoining ink droplets described above, the number of adjoining ink droplets 50 for the ink droplet 50*s*1 is six (6), and the number of adjoining ink droplets 50 for the ink droplet 50*s*2 is four (4). For example, a threshold number for a necessary number of adjoining ink droplets 50, which may be set in advance, may be four (4). Therefore, the ink droplets 50 to be discharged in the second run may be located at the positions, at which the number of adjoining ink droplets 50 is predicted to be four or more.

Figure 10:
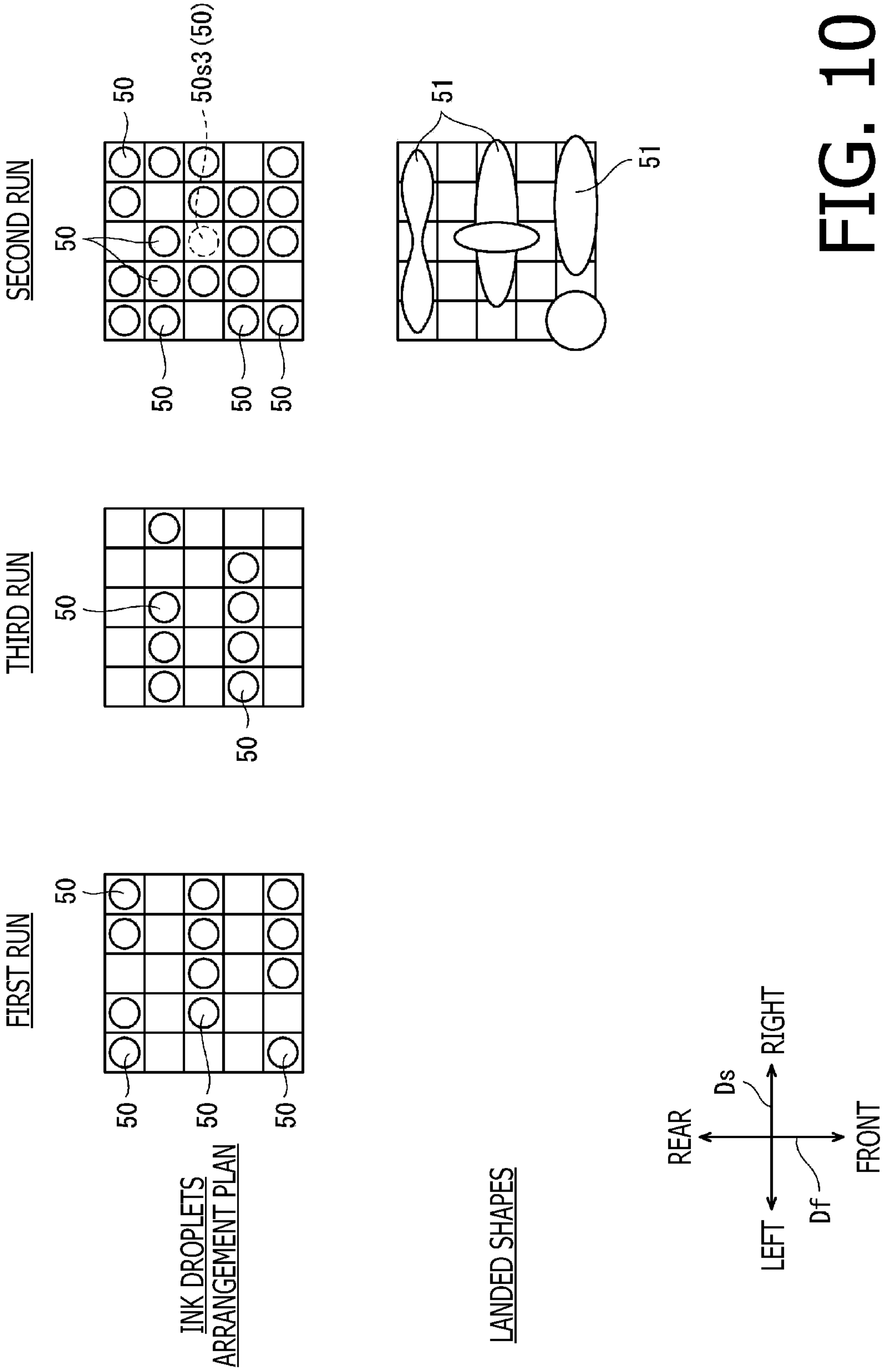
FIG. 10 illustrates positions of the ink droplets discharged in the second run of the carriage in the printing apparatus.

Moreover, based on the premise that the ink droplets arrangement plans comply with Rules 1 and 2 described above, another rule may optionally be added. That is, the ink droplet 50 to be discharged in the second run may be located at a position, where the ink droplet 50 discharged in the second run will overlap one of the ink droplets 50 discharged in the first run, and where the number of adjoining ink droplets 50 to the one of the ink droplets 50 discharged in the first run is large (Rule 3). Rule 3 is based on an intention that the ink droplet 50 discharged in the second run may break the continuity between the ink droplets 50 discharged in the first run in the main scanning direction Ds. For example, as shown in FIG. 10, an ink droplet 50*s*3 shown in a broken line is located at a position of the third row in the third column. The ink droplet 50*s*3 overlaps the ink droplet 50 located at the position of the third row in the third column discharged in the first run, and the number of adjoining ink droplets 50 to the ink droplet 50 discharged in the first run is two (2), which is relatively large. In this regard, optionally, a threshold value to a number of the ink droplets 50 that are discharged in the first run and will adjoin the ink droplet 50*s*3 to be discharged in the second run may be set in advance.

Optionally, the dots-linked portions 51, the dividing dots 52, and the divided-dots linking portions 53 may be formed when an amount of the ink droplets to be discharged is greater than or equal to a predetermined threshold value. In this regard, the amount of the ink droplets to be discharged may either be duty in a single sheet of printable medium W or duty in a single pass of printing.

As described above, according to the printing apparatus 1 in the embodiment, the dividing dots 52, which adjoin or overlap the dots-linked portion 51 extending longitudinally in the main scanning direction Ds, and the divided-dots linking portions 53, which adjoin or overlap the dots-linked portions 51 extending longitudinally in the sub-scanning direction Df, are formed. The dots-linked portions 51 are formed of the ink droplets 50 discharged and cured in the first run of the carriage 3. In the second run of the carriage 3, the ink droplets 50 to form the dividing dots 52 and the ink droplets 50 to form the parts 53*a* of the divided-dots linking portions 53 are placed on the printable medium W. In the second run, the ink droplets 50 to form the dividing dots 52 and the ink droplets 50 to form the parts 53*a* of the divided-dots linking portions 53 are, without being irradiated with the UV rays, not cured. Therefore, the ink droplets 50 discharged in the third run of the carriage 3, i.e., the ink droplets 50 to form the remainder parts 53*b* of the divided-dots linking portions 53, are drawn to and join the uncured ink droplets 50 discharged in the second run, i.e., the ink droplets 50 to form the parts 53*a* of the divided-dots linking portion 53. Thus, the uncured ink droplets 50 discharged in the second run and the ink droplets discharged in the third run may be linked with each other in the sub-scanning direction Df easily, and the divided-dots linking portions 53 extending longitudinally in the sub-scanning direction Df may be formed. Therefore, the ink droplets 50 may be restrained or prevented from joining each other in the main scanning direction Ds. Meanwhile, the dividing dots 52 are formed to adjoin or overlap the dots-linked portions 51; therefore, the dots-linked portion 51 may be divided in the main scanning direction Ds. Accordingly, the ink droplet 50 discharged in the second run may break the continuity between the ink droplets 50 discharged in the first run in the main scanning direction Ds. Thus, defects such as streaks and uneven gloss along the main scanning direction Ds in the printed image may be restrained or prevented, and quality of the printed image may be improved.

Moreover, according to the embodiment of the present disclosure, the discharging head 10A may perform bidirectional printing; therefore, high-duty printing may be provided.

Furthermore, the part 53*a* of the divided-dots linking portion 53 adjoins the remainder part 53*b* of the divided-dots linking portion 53 in the sub-scanning direction Df. Therefore, the divided-dots linking portion 53 may be formed in the elongated shape extending in the sub-scanning direction Df.

Furthermore, according to the embodiment of the present disclosure, the divided-dots linking portions 53 are located at positions displaced in the main scanning direction Ds from one another. In other words, the divided-dots linking portions 53 are located at different positions in the main scanning direction Ds without overlapping one another. Meanwhile, as shown in FIG. 8, the dividing dots 52 are located at different positions in the main scanning direction Ds from one another. Therefore, continuity in the main scanning direction Ds between the divided-dots linking portions 53 overlapping and continuity in the main scanning direction Ds between the dividing dots 52 overlapping may be restrained.

Furthermore, according to the embodiment of the present disclosure, the dots-linked portions 51, the dividing dots 52, and the divided-dots linking portions 53 may be formed when the amount of the ink droplets discharged is larger than or equal to the threshold values. Therefore, when the amount of the ink droplets discharged is smaller than the threshold value, in other words, if the streaks and the gloss unevenness are unlikely to occur, it may be prevented that the dots-linked portions 51, the dividing dots 52, and the divided-dots linking portions 53 are formed unnecessarily.

Modified Examples

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

For example, the ink droplets arrangement plans for the first, second, and third runs shown in FIG. 8 may be rearranged in an order of the ink droplets arrangement plans for the second, third, and first runs. Moreover, the order of the ink droplets arrangement plans shown in FIG. 6 may be rearranged in the same manner.

Figure 11:
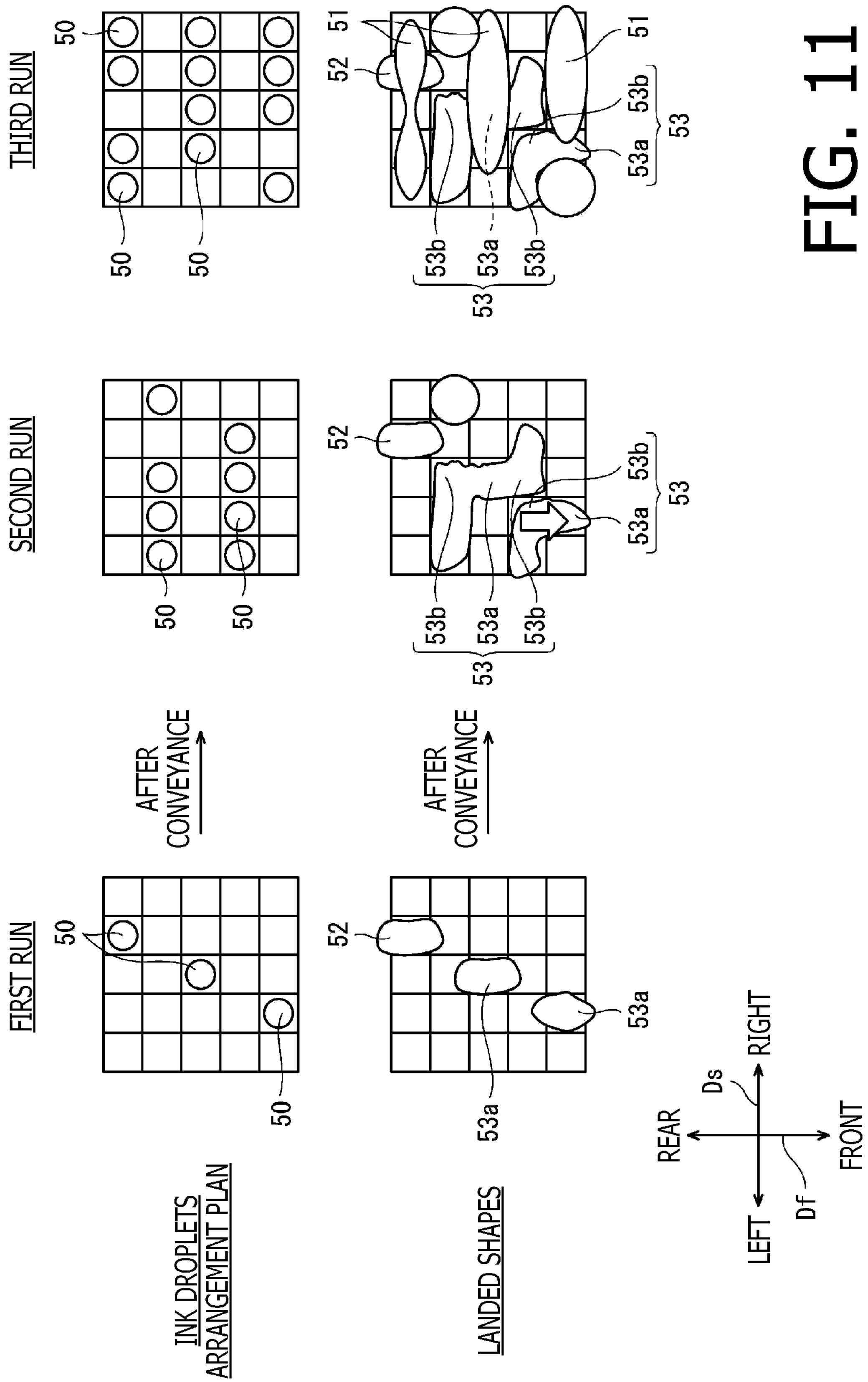
FIG. 11 illustrates another ink droplets arrangement plans and shapes of the ink droplets after landing for first through third runs of the carriage in the printing apparatus.

As shown in FIG. 11, the ink droplets arrangement plan for the first run is the same as the ink droplets arrangement plan for the second run shown in FIG. 8. The CPU 20 in the controller unit 19 may control the carriage 3 to move rightward along the main scanning direction Ds for the first run and control the discharging head 10A to discharge the ink droplets 50 at the printable medium W, without operating the lighting unit 40A for irradiating the ink droplets 50 landed on the printable medium W with the UV rays. Thereby, the ink droplets 50 discharged in the first run may stay uncured, and the uncured ink droplet 50 is placed at the position of the first row in the fourth column to form a dividing dot 52, and the uncured ink droplets 50 are placed at the positions of the third row in the third column and the fifth row in the second column to form parts 53*a* of the divided-dots linking portions 53.

The ink droplets arrangement plan for the second run is the same as the ink droplets arrangement plan for the third run shown in FIG. 8. The CPU 20 in the controller unit 19 may control the platen 6 to move the printable medium W in the sub-scanning direction Df by a predetermined amount, thereafter, control the carriage 3 to move leftward along the main scanning direction Ds, control the discharging head 10A to discharge the ink droplets 50 at the printable medium W, and control the lighting unit 40A to irradiate the ink droplets 50 landed on the printable medium W with the UV rays. Thereby, the ink droplets 50 to form the dividing dots 52 are placed, and the ink droplets 50 to form the remainder parts 53*b* of the divided-dots linking portion 53 and the parts 53*a* of the divided-dots linking portion 53 are linked and cured to form the divided-dots linking portions 53, which extend longitudinally in the sub-scanning direction Df When the ink droplets 50 to form the remainder parts 53*a* of the divided-dots linking portion 53 are discharged, the ink droplets 50 may be drawn in the sub-scanning direction Df and linked with the ink droplets 50 forming the parts 53*a*, in the same manner as described above.

The ink droplets arrangement plan for the third run is the same as the ink droplets arrangement plan for the first run shown in FIG. 8. The CPU 20 in the controller unit 19 may, without operating the platen 6 to move the printable medium W, control the carriage 3 to move rightward along the main scanning direction Ds, control the discharging head 10A to discharge the ink droplets 50 at the printable medium W, and control the lighting unit 40A to irradiate the ink droplets 50 landed on the printable medium W with the UV rays. Thereby, the cured dots-linked portions 51 are formed. According to the modified order of the ink droplets arrangements, some of the ink droplets 50 discharged in the second run may be restrained from joining one another in the main scanning direction Ds.

For another example, the order of the ink droplets arrangement plans for the first, second, and third runs shown in FIG. 8 may be rearranged to an order of the ink droplets arrangement plans for the third, second, and first runs. Moreover, the order of the ink droplets arrangement plans shown in FIG. 6 may be rearranged in the same manner.

Figure 12:
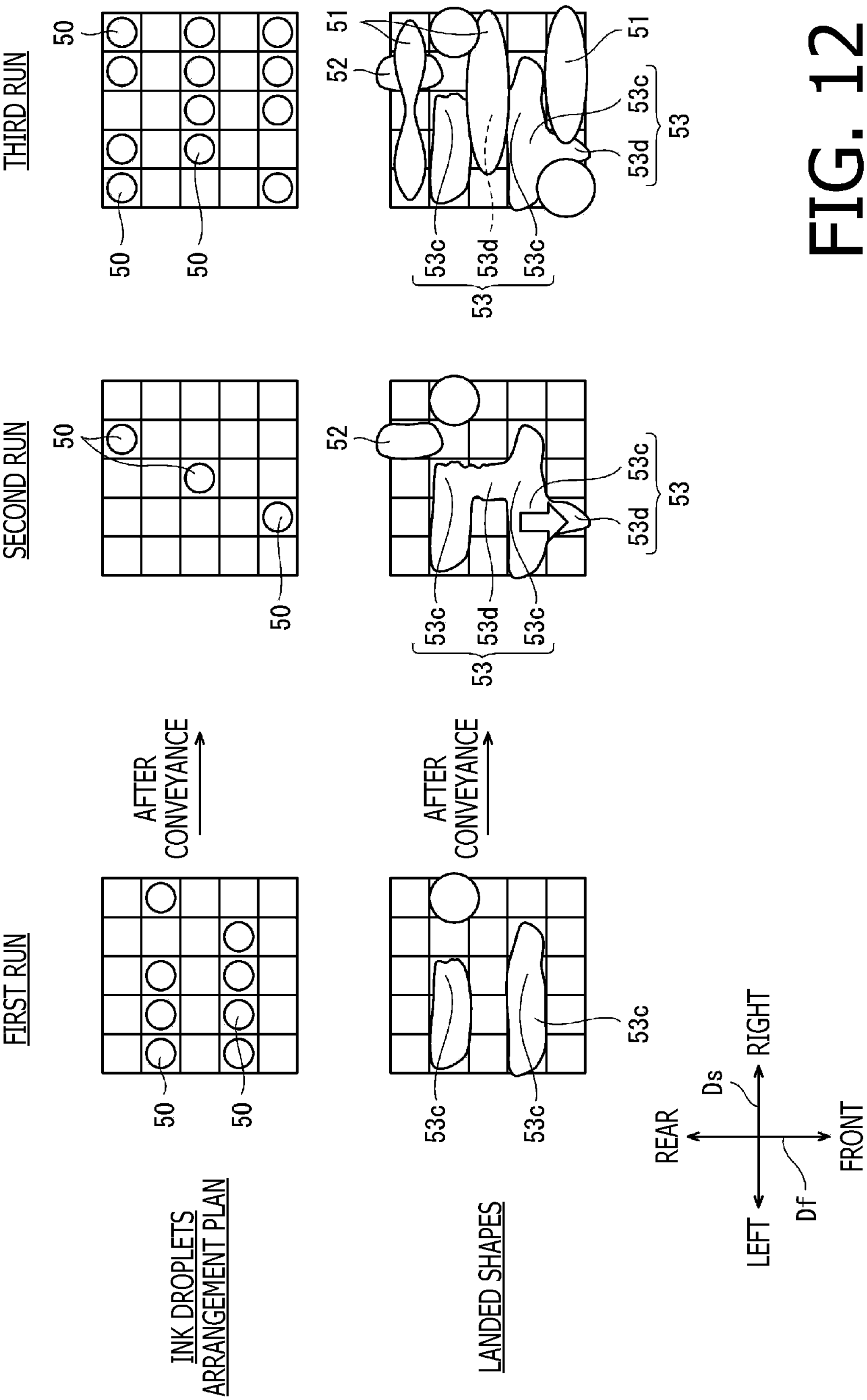
FIG. 12 illustrates another ink droplets arrangement plans and shapes of the ink droplets after landing for first through third runs of the carriage in the printing apparatus.

As shown in FIG. 12, the ink droplets arrangement plan for the first run is the same as the ink droplets arrangement plan for the third run shown in FIG. 8. The CPU 20 in the controller unit 19 may control the carriage 3 to move rightward along the main scanning direction Ds for the first run and control the discharging head 10A to discharge the ink droplets 50 at the printable medium W, without operating the lighting unit 40A for irradiating the ink droplets 50 landed on the printable medium W with the UV rays. Thereby, the ink droplets 50 discharged in the first run may stay uncured, and the uncured ink droplets 50 are placed at the position of the second row in the third column and the position of the fourth row in the third column to form parts 53*c* of the divided-dots linking portions 53.

The ink droplets arrangement plan for the second run is the same as the ink droplets arrangement plan for the second run shown in FIG. 8. The CPU 20 in the controller unit 19 may control the platen 6 to move the printable medium W in the sub-scanning direction Df by a predetermined amount, thereafter, control the carriage 3 to move leftward along the main scanning direction Ds, and control the discharging head 10A to discharge the ink droplets 50 at the printable medium W. Thereby, some of the ink droplets 50 discharged in the first run, i.e., the ink droplets 50 to form the parts 53*c* of the divided-dots linking portions 53, which remain uncured, may be drawn to the ink droplets 50 forming the remainder parts 53*d* of the divided-dots linking portions 53. Accordingly, the ink droplets 50 discharged in the first run at the positions of the fourth row in the first through fourth column may be restrained from joining one another in the main scanning direction Ds. With the ink droplets 50 being restrained from joining one another, the CPU 20 in the controller unit 19 may control the lighting unit 40A to irradiate the ink droplets 50 with the UV rays. Accordingly, on the printable medium W, the dividing dots 52 are placed, and the divided-dots linking portions 53 elongated in the sub-scanning direction Df, in which the parts 53*c* and the remainder parts 53*d* are linked, are placed.

The ink droplets arrangement plan for the third run is the same as the ink droplets arrangement plan for the first run shown in FIG. 8. The CPU 20 in the controller unit 19 may, without operating the platen 6 to move the printable medium W, control the carriage 3 to move rightward along the main scanning direction Ds, control the discharging head 10A to discharge the ink droplets 50 at the printable medium W, and control the lighting unit 40A to irradiate the ink droplets 50 landed on the printable medium W with the UV rays. Thereby, the cured dots-linked portions 51 are formed. According to the modified order of the ink droplets arrangement plans, some of the ink droplets 50 discharged in the second run may be restrained from joining one another in the main scanning direction Ds.

In the embodiment described above, the lighting unit 40 energizes the discharged ink droplets 50 by emitting the UV rays at the ink droplets 50. However, optionally, the lighting unit 40 may be replaced with another energizer that may supply different type of energy, such as heat or microwaves, to the ink droplets 50 to cure the ink droplets 50.

For another example, the discharging head 10 may not necessarily include two (2) discharging heads 10A, 10B but may have a single discharging head 10 alone, and the lighting unit 40 may not necessarily include two (2) lighting units 40A, 40B but may have a single lighting unit 40 alone.

What is claimed is:

1. A printing apparatus, comprising:
- a discharging head configured to discharge ultraviolet-curable ink droplets at a printable medium;
- an energizer configured to supply energy for curing to the ultraviolet-curable ink droplets;
- a carriage having the discharging head and the energizer mounted thereon, the carriage being configured to move in a main scanning direction; and
- a controller configured to, by controlling the carriage to move in the main scanning direction, the discharging head to discharge the ultraviolet-curable ink droplets at the printable medium, and the energizer to supply energy to the ultraviolet-curable ink droplets landed on the printable medium,
  - form a dots-linked portion, the dots-linked portion having a plurality of the ultraviolet-curable ink droplets landed on the printable medium being linked with one another and cured in a shape elongated in the main scanning direction, and form one of:

both a dividing dot, the dividing dot being formed of a single one of the ultraviolet-curable ink droplets cured independently at a position to one of adjoin and overlap the dots-linked portion in the main scanning direction, and a divided-dots linking portion, the divided-dots linking portion having a plurality of the ultraviolet-curable ink droplets landed on the printable medium being linked with one another and cured in a shape elongated in a sub-scanning direction, the sub-scanning direction intersecting with the main scanning direction; and the divided-dots linking portion alone.

2. The printing apparatus according to claim 1, further comprising a conveyer configured to convey the printable medium, wherein the controller is configured to, control the carriage to perform a first run, by moving the carriage in the main scanning direction, and control the discharging head to discharge the plurality of the ultraviolet-curable ink droplets to form the dots-linked portion and cure the plurality of the ultraviolet-curable ink droplets discharged in the first run by controlling the energizer to supply energy to the plurality of the ultraviolet-curable ink droplets discharged in the first run, after the first run of the carriage, control the conveyer not to convey the printable medium, place one of the ultraviolet-curable ink droplets to form a part of the divided-dots linking portion on the printable medium by controlling the carriage to perform a second run, by moving the carriage in the main scanning direction, and controlling the discharging head to discharge the one of the ultraviolet-curable ink droplets to form the part of the divided-dots linking portion and allowing the one of the ultraviolet-curable ink droplets discharged in the second run to stay uncured by controlling the energizer not to supply energy to the one of the ultraviolet-curable ink droplets discharged in the second run, and after the second run of the carriage, control the conveyer to convey the printable medium in the sub-scanning direction, thereafter place a plurality of the ultraviolet-curable ink droplets to form a remainder part of the divided-dots linking portion on the printable medium and cure the ultraviolet-curable ink droplets including the one of the ultraviolet-curable ink droplets to form the part of the divided-dots linking portion and the plurality of the ultraviolet-curable ink droplets to form the remainder part of the divided-dots linking portion by controlling the carriage to perform a third run, by moving the carriage in the main scanning direction, and controlling the discharging head to discharge the plurality of the ultraviolet-curable ink droplets to form the remainder part of the divided-dots linking portion and the energizer to supply energy to the ultraviolet-curable ink droplets including the one of the ultraviolet-curable ink droplets to form the part of the divided-dots linking portion and the plurality of the ultraviolet-curable ink droplets to form the remainder part of the divided-dots linking portion.

3. The printing apparatus according to claim 2, wherein the controller is configured to:

control the carriage and the discharging head to perform bidirectional printing, by controlling the carriage to move in one way and an other way opposite to the one way in the main scanning direction, and controls the discharging head to discharge the ultraviolet-curable ink droplets, and in the first run and the third run, control the carriage to move in the one way, and in the second run, control the carriage to move in the other way.

4. The printing apparatus according to claim 2, wherein the part of the divided-dots linking portion and the remainder part of the divided-dots linking portion adjoin each other in the sub-scanning direction.

5. The printing apparatus according to claim 2, wherein the divided-dots linking portion includes a plurality of divided-dots linking portions, and the plurality of divided-dots linking portions are located at positions displaced from one another in the main scanning direction.

6. The printing apparatus according to claim 2, wherein the controller is configured to form the dots-linked portion and the divided-dots linking portion when an amount of the ultraviolet-curable ink droplets to be discharged at the printable medium is greater than or equal to a threshold amount.

7. The printing apparatus according to claim 1, further comprising a conveyer configured to convey the printable medium, wherein the controller is configured to, control the carriage to perform a first run, by moving the carriage in the main scanning direction, and control the discharging head to discharge the plurality of the ultraviolet-curable ink droplets to form the dots-linked portion and cure the plurality of the ultraviolet-curable ink droplets discharged in the first run by controlling the energizer to supply energy to the plurality of the ultraviolet-curable ink droplets discharged in the first run, after the first run of the carriage, controlling the conveyer not to convey the printable medium, place the one of the ultraviolet-curable ink droplets to form the dividing dot and one of the ultraviolet-curable ink droplets to form a part of the divided-dots linking portion on the printable medium by controlling the carriage to perform a second run, by moving the carriage in the main scanning direction, and controlling the discharging head to discharge the one of the ultraviolet-curable ink droplets to form the dividing dot and the one of the ultraviolet-curable ink droplets to form the part of the divided-dots linking portion and allowing the ultraviolet-curable ink droplets discharged in the second run to stay uncured by controlling the energizer not to supply energy to the ultraviolet-curable ink droplets discharged in the second run, and after the second run of the carriage, control the conveyer to convey the printable medium in the sub-scanning direction, thereafter place a plurality of the ultraviolet-curable ink droplets to form a remainder part of the divided-dots linking portion on the printable medium and cure the ultraviolet-curable ink droplets including the one of the ultraviolet-curable ink droplets to form the dividing dot, the one of the ultraviolet-curable ink droplets to form the part of the divided-dots linking portion, and the plurality of the ultraviolet-curable ink droplets to form the remainder part of the divided-dots linking portion by controlling the carriage to perform a third run, by moving the carriage in the main scanning direction, and controlling the discharging head to discharge the plurality of the ultraviolet-curable ink droplets to form the remainder part of the divided-dots linking portion and the energizer to supply energy to the ultraviolet-curable ink droplets including the one of the ultraviolet-curable ink droplets to form the dividing dot, the one of the ultraviolet-curable ink droplets to form the part of the divided-dots linking portion, and the plurality of the ultraviolet-curable ink droplets to form the remainder part of the divided-dots linking portion.

8. The printing apparatus according to claim 7, wherein the controller is configured to:

control the carriage and the discharging head to perform bidirectional printing, by moving the carriage in one way and an other way opposite to the one way in the main scanning direction and controls the discharging head to discharge the ultraviolet-curable ink droplets, and in the first run and the third run, control the carriage to move in the one way, and in the second run, control the carriage to move in the other way.

9. The printing apparatus according to claim 7, wherein the part of the divided-dots linking portion and the remainder part of the divided-dots linking portion adjoin each other in the sub-scanning direction.

10. The printing apparatus according to claim 7, wherein the dividing dot includes a plurality of dividing dots, and the divided-dots linking portion includes a plurality of divided-dots linking portions, and the plurality of dividing dots are located at positions displaced from one another in the main scanning direction, and the plurality of divided-dots linking portions are located at positions displaced from one another in the main scanning direction.

11. The printing apparatus according to claim 7, wherein the controller is configured to form the dots-linked portion and the divided-dots linking portion when an amount of the ultraviolet-curable ink droplets to be discharged at the printable medium is greater than or equal to a threshold amount.

12. The printing apparatus according to claim 1, further comprising a conveyer configured to convey the printable medium, wherein the controller is configured to, place the one of the ultraviolet-curable ink droplets to form the dividing dot and one of the ultraviolet-curable ink droplets to form a part of the divided-dots linking portion on the printable medium by controlling the carriage to perform a first run, by moving the carriage in the main scanning direction, and controlling the discharging head to discharge the one of the ultraviolet-curable ink droplets to form the dividing dot and the one of the ultraviolet-curable ink droplets to form the part of the divided-dots linking portion and allowing the ultraviolet-curable ink droplets discharged in the first run to stay uncured by controlling the energizer not to supply energy to the ultraviolet-curable ink droplets discharged in the first run, after the first run of the carriage, control the conveyer to convey the printable medium in the sub-scanning direction, thereafter place a plurality of the ultraviolet-curable ink droplets to form a remainder part of the divided-dots linking portion on the printable medium and cure the ultraviolet-curable ink droplets including the one of the ultraviolet-curable ink droplets to form the dividing dot, the one of the ultraviolet-curable ink droplets to form the part of the divided-dots linking portion, and the plurality of the ultraviolet-curable ink droplets to form the remainder part of the divided-dots linking portion by controlling the carriage to perform a second run, by moving the carriage in the main scanning direction, and controlling the discharging head to discharge the plurality of the ultraviolet-curable ink droplets to form the remainder part of the divided-dots linking portion and the energizer to supply energy to the ultraviolet-curable ink droplets including the one of the ultraviolet-curable ink droplets to form the dividing dot, the one of the ultraviolet-curable ink droplets to form the part of the divided-dots linking portion, and the plurality of the ultraviolet-curable ink droplets to form the remainder part of the divided-dots linking portion, and after the second run of the carriage, control the conveyer not to convey the printable medium, control the carriage to perform a third run, by moving the carriage in the main scanning direction, and control the discharging head to discharge the plurality of the ultraviolet-curable ink droplets to form the dots-linked portion and cure the ultraviolet-curable ink droplets including the plurality of the ultraviolet-curable ink droplets to form the dots-linked portion by controlling the energizer to supply energy to the ultraviolet-curable ink droplets including the plurality of the ultraviolet-curable ink droplets.

13. The printing apparatus according to claim 12, wherein the part of the divided-dots linking portion and the remainder part of the divided-dots linking portion adjoin each other in the sub-scanning direction.

14. The printing apparatus according to claim 12, wherein the dividing dot includes a plurality of dividing dots, and the divided-dots linking portion includes a plurality of divided-dots linking portions, and the plurality of dividing dots are located at positions displaced from one another in the main scanning direction, and the plurality of divided-dots linking portions are located at positions displaced from one another in the main scanning direction.

15. The printing apparatus according to claim 12, wherein the controller is configured to form the dots-linked portion and the divided-dots linking portion when an amount of the ultraviolet-curable ink droplets to be discharged at the printable medium is greater than or equal to a threshold amount.

16. The printing apparatus according to claim 1, further comprising a conveyer configured to convey the printable medium, wherein the controller is configured to, place a plurality of the ultraviolet-curable ink droplets to form a part of the divided-dots linking portion by controlling the carriage to perform a first run, by moving the carriage in the main scanning direction, and controlling the discharging head to discharge the plurality of the ultraviolet-curable ink droplets to form the part of the divided-dots linking portion, and allowing the plurality of the ultraviolet-curable ink droplets discharged in the first run to stay uncured by controlling the energizer not to supply energy to the plurality of the ultraviolet-curable ink droplets discharged in the first run, after the first run of the carriage, control the conveyer to convey the printable medium in the sub-scanning direction, thereafter place the one of the ultraviolet-curable ink droplets to form the dividing dot and a plurality of the ultraviolet-curable ink droplets to form a remainder part of the divided-dots linking portion on the printable medium and cure the ultraviolet-curable ink droplets including the one of the ultraviolet-curable ink droplets to form the dividing dot, the plurality of the ultraviolet-curable ink droplets to form the part of the divided-dots linking portion, and the plurality of the ultraviolet-curable ink droplets to form the remainder part of the divided-dots linking portion by controlling the carriage to perform a second run, by moving the carriage in the main scanning direction, and controlling the discharging head to discharge the ultraviolet-curable ink droplets including the one of the ultraviolet-curable ink droplets to form the dividing dot and the plurality of the ultraviolet-curable ink droplets to form the remainder part of the divided-dots linking portion and the energizer to supply energy to the ultraviolet-curable ink droplets including the one of the ultraviolet-curable ink droplets to form the dividing dot, the plurality of the ultraviolet-curable ink droplets to form the part of the divided-dots linking portion, and the plurality of the ultraviolet-curable ink droplets to form the remainder part of the divided-dots linking portion, and after the second run of the carriage, control the conveyer not to convey the printable medium, control the carriage to perform a third run, by moving the carriage in the main scanning direction, and control the discharging head to discharge the plurality of the ultraviolet-curable ink droplets to form the dots-linked portion and cure the ultraviolet-curable ink droplets including the plurality of the ultraviolet-curable ink droplets to form the dots-linked portion by controlling the energizer to supply energy to the ultraviolet-curable ink droplets including the plurality of the ultraviolet-curable ink droplets to form the dots-linked portion.

17. The printing apparatus according to claim 16, wherein the part of the divided-dots linking portion and the remainder part of the divided-dots linking portion adjoin each other in the sub-scanning direction.

18. The printing apparatus according to claim 16, wherein the dividing dot includes a plurality of dividing dots, and the divided-dots linking portion includes a plurality of divided-dots linking portions, and the plurality of dividing dots are located at positions displaced from one another in the main scanning direction, and the plurality of divided-dots linking portions are located at positions displaced from one another in the main scanning direction.

19. The printing apparatus according to claim 16, wherein the controller is configured to form the dots-linked portion and the divided-dots linking portion when an amount of the ultraviolet-curable ink droplets to be discharged at the printable medium is greater than or equal to a threshold amount.

* * * * *